United States Patent
Marupaduga et al.

(10) Patent No.: US 10,433,222 B1
(45) Date of Patent: Oct. 1, 2019

(54) USE OF UPLINK TRANSMISSION POWER FROM DISTANT DEVICES AS BASIS TO CONTROL SERVICE

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/962,774

(22) Filed: Apr. 25, 2018

(51) Int. Cl.
| | | |
|---|---|---|
| *H04W 36/00* | (2009.01) | |
| *H04W 36/16* | (2009.01) | |
| *H04W 52/14* | (2009.01) | |
| *H04W 52/24* | (2009.01) | |

(52) U.S. Cl.
CPC ..... *H04W 36/0094* (2013.01); *H04W 36/165* (2013.01); *H04W 52/146* (2013.01); *H04W 52/241* (2013.01)

(58) Field of Classification Search
CPC ............. H04W 36/0055; H04W 36/30; H04W 72/0413; H04W 24/10; H04W 76/023; H04W 48/16; H04W 52/244; H04W 16/32; H04B 7/0626; H04B 7/0456

USPC .................................. 370/332, 334; 455/436
See application file for complete search history.

(56) References Cited

U.S. PATENT DOCUMENTS

| | | | |
|---|---|---|---|
| 2004/0156372 A1 | 8/2004 | Hussa | |
| 2009/0286563 A1 | 11/2009 | Ji et al. | |
| 2014/0302853 A1* | 10/2014 | Militano | ........... H04W 36/0055 455/436 |

OTHER PUBLICATIONS

K. Davaslioglu and E. Ayanoglu, "Interference-Based Cell Selection in Heterogenous Networks," printed from the World Wide Web Nov. 10, 2017.

* cited by examiner

*Primary Examiner* — Phuoc H Doan (57) ABSTRACT

A method and system for controlling service of user equipment devices (UEs) by a base station in a wireless communication system. In an example arrangement, the base station detects that uplink noise on its air interface is threshold high and that multiple UEs being served by the base station are threshold distant from the base station. In response to detecting this combination of factors, the base selects at least one of the threshold distant UEs for the base station to stop serving, with the selection being based on the UE having highest uplink transmission power among the multiple served UEs that are threshold distant from the base station, and the base station then causes handover of the selected UE from the base station.

20 Claims, 4 Drawing Sheets

USE OF UPLINK TRANSMISSION POWER FROM DISTANT DEVICES AS BASIS TO CONTROL SERVICE

BACKGROUND

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In turn, each base station could be coupled with network infrastructure that provides connectivity with one or more transport networks, such as the public switched telephone network (PSTN) and/or the Internet for instance. With this arrangement, a UE within coverage of the network could engage in air interface communication with a base station and could thereby communicate via the base station with various remote network entities or with other UEs served by the base station.

Further, a cellular wireless network may operate in accordance with a particular air interface protocol or radio access technology, with communications from the base stations to mobile terminals defining a downlink or forward link and communications from the UEs to the base stations defining an uplink or reverse link. Examples of existing air interface protocols include 3G technologies such as Code Division Multiple Access (CDMA) and Global System for Mobile Communication (GSM), 4G technologies such as Long Term Evolution (LTE) (using orthogonal frequency division multiple access (OFDMA) on the downlink and single-carrier frequency division multiple access (SC-FDMA) on the uplink, and developing 5G technologies, among others. Each protocol may define its own procedures for registration of UEs, initiation of communications, handover between coverage areas, and other functions related to air interface communication.

In accordance with the air interface protocol, each coverage area may operate on one or more carrier frequencies or range of carrier frequencies. Further, each coverage area may define a number of air interface channels or specific resources for carrying signals and information between the base station and UEs. For instance, certain resources on the downlink may be reserved to carry a reference signal that UEs can measure to evaluate coverage quality, other resources on the downlink may be reserved to carry other control signaling to UEs, and still other resources on the downlink may be reserved to carry bearer traffic and other such communications from the base station to UEs. Likewise, certain resources on the uplink may be reserved to carry various control signaling, such as access requests and scheduling requests, from UEs to the base station, and other resources on the uplink may be reserved to carry bearer traffic and other such communications from UEs to the base station.

When a UE first powers on or otherwise enters into coverage of such a system, the UE may search for a best coverage area in which to operate and may then engage in signaling to acquire wireless connectivity with the base station that provides that coverage area. For instance the UE could search for a coverage area whose downlink reference signal has a highest signal-to-noise ratio (SINR)—as reference signal receive quality (RSRQ)—or a highest signal strength—as reference signal receive power (RSRP). And the UE could then engage in random-access signaling and connection signaling with the base station providing that coverage area, to establish a radio-link-layer connection with the base station. Further, the UE could engage in attach signaling with the network to register for service.

When a UE is served by a base station, the UE may regularly monitor the reference signal from that base station and reference signals from other base stations in the vicinity, to help ensure that the UE continues to operate in a most appropriate coverage area. If the UE finds that one or more other base stations provide sufficiently better coverage than the UE's currently serving base station, then the UE may initiate handover. For instance, the UE may transmit to its serving base station a measurement report that specifies the one or more detected coverage areas and, for each such coverage area, a determined RSRP and/or RSRQ. The serving base station (as source base station) and/or associated network infrastructure may then decide based on the UE's measurement report to coordinate a handover of the UE to a particular base station (as target base station) from which the UE detected best coverage.

Optimally, a wireless service provider will strategically implement base stations throughout a market area so that served UEs can transition between the base stations' coverage areas without experiencing a loss of coverage. Each base station may include an antenna structure and associated equipment, and the service provider may connect each base station by a landline cable (e.g., a T1 line) with the service provider's core network, to enable the base station to communicate on that network.

In some situations, however, it may be impractical for a wireless service provider to run landline connections to base stations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To provide coverage in such locations, the wireless service provider may instead implement relays, each of which could be configured to operate in much the same way as a conventional landline-connected base station but could have a wireless backhaul connection to a core network. In particular, each relay could include a relay base station and an associated "UE-relay" module (integrated or communicatively linked together). The UE-relay module, and thus the relay, could then be served by an existing base station of the network, referred to as a donor base station, with the air interface between the UE-relay and the donor base station defining a wireless backhaul connection for the relay. With this arrangement, the relay could thus conveniently communicate with the core network (e.g. with other entities on the core network) via the wireless backhaul connection and the donor base station.

Overview

When UEs are put into service in a given area and scan for coverage, the UEs would likely discover coverage from a nearby base station, as the UEs may detect highest SINR from the nearby base station. In some situations, however, UEs may end up connecting with a more distant base station. This could happen, for instance, if the nearby base station is already serving many other UEs (perhaps many UE-relays), in which case the nearby base station may decline to serve newly arriving UEs, or newly arriving UEs may detect relatively low SINR from the nearby base station. Unfortunately, however, this could pose an issue for service at the distant base station, as uplink transmissions from distant UEs may contribute to uplink noise at the base station, which could impact the base station's service of other UEs.

Disclosed herein is a method and system that may help address this issue. In an example arrangement, a base station will detect that uplink noise on its air interface is threshold high and that multiple UEs being served by the base station are threshold distant from the base station. In response to detecting this combination of factors, the base station will then select at least one of the threshold distant UEs for the base station to stop serving, with the selection being based on the UE having highest uplink transmission power among the multiple served UEs that are threshold distant from the base station. Upon selecting the UE to stop serving, the base station will then cause the selected UE to be handed over from the base station to another base station. Optimally, by handing out the threshold distant UE that has the highest uplink transmission power of the threshold distant served UEs, the base station may help improve service of one or more other UEs, as the relatively high power transmissions to/from the selected UE could be avoided.

Accordingly, in one respect, disclosed is method for controlling service of UEs in a wireless communication system in which a base station provides a coverage area defining an air interface having a downlink and an uplink. Per the method, the base station detects that noise on the uplink is threshold high and that a plurality of UEs being served by the base station are each located at least a predefined threshold distance from the base station. Further, responsive to at least the detecting, (i) the base station selects at least one of the UEs of the plurality to be handed over from the base station, with the selecting of the UE being based on the UE having highest uplink transmission power of the plurality of UEs that are each located at least the predefined threshold distance from the base station, and (ii) the base station causes the selected UE to be handed over from the base station.

In another respect, disclosed is a base station configured to control service of UEs. Per the disclosure, the base station comprises (i) a wireless communication interface, including an antenna structure and transceiver, configured to provide a coverage area defining an air interface having a downlink and an uplink, (ii) a processing unit, (iii) data storage, and (iv) program instructions stored in the data storage and executable by the processing unit to cause the base station to carry out operations such as those noted above.

And in yet another respect, disclosed is a method of controlling service in a wireless communication system in which a base station provides a coverage area defining an air interface having a downlink and an uplink. Per the method, the base station serves a plurality of UEs in the coverage area. Further, while serving the plurality of UEs in the coverage area, the base station detects a trigger for UE-handover, such as detecting that a noise floor on the uplink is threshold high. And in response to at least detecting the trigger, (i) the base station selects at least one of the UEs of the plurality to be handed over from the base station, with the selecting being based on the selected UE having a highest uplink transmission power of the UEs of the plurality and being located at least a threshold distance from the base station, and (ii) the base station causes the selected UE to be handed over from the base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein by way of example with respect to an LTE network. It should be understood, however, that principles of the disclosure can apply in connection with other types of networks as well. Further, even in the context of LTE, it should be understood that variations from the disclosed examples are possible. For instance, features can be added, omitted, combined, distributed, repositioned, and/or re-ordered. In addition, it should be understood that features described as being carried out by one or more entities can be implemented by hardware, firmware, and/or software, such as by a computer programmed with program instructions executable to carry out the described features.

Figure 1:
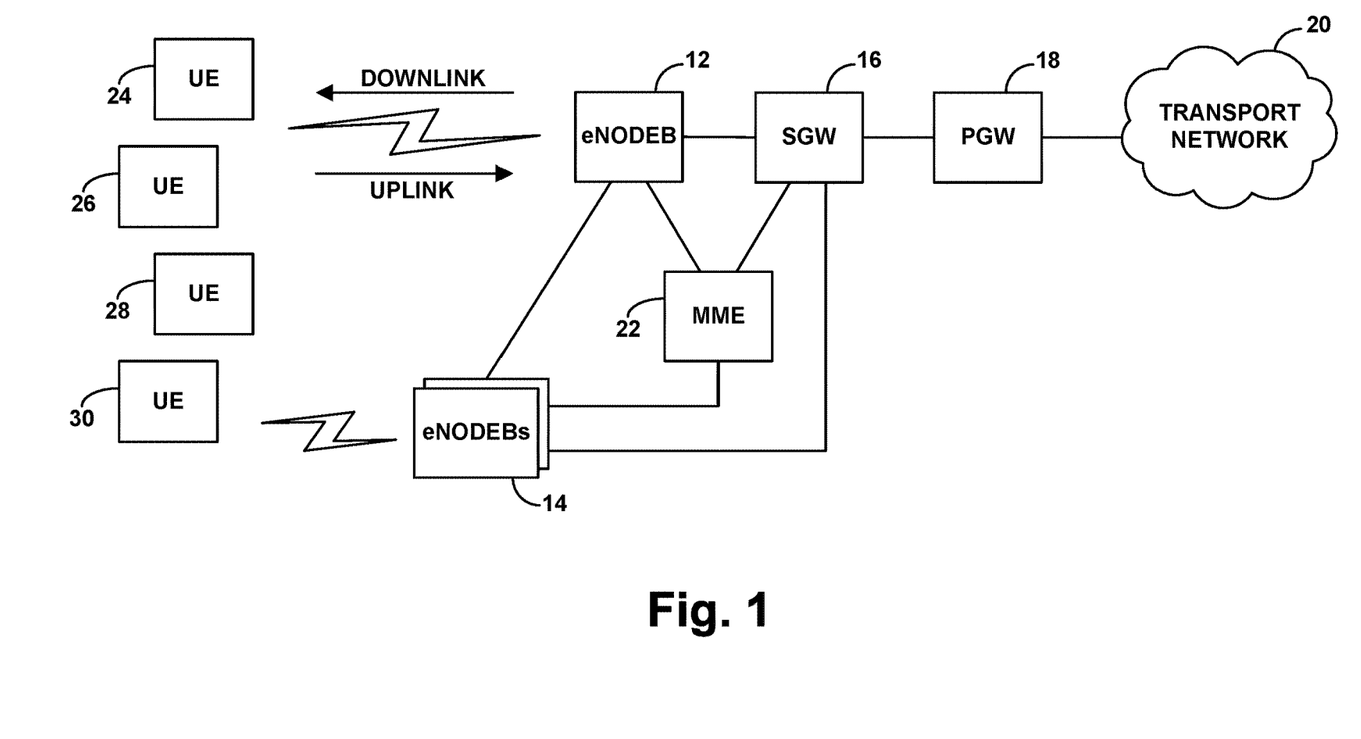
FIG. 1 is a simplified block diagram of an example wireless communication system in which features of the present disclosure can be implemented.

FIG. 1 is a simplified block diagram of an example LTE network in which the disclosed features can be implemented. In the LTE network, each base station is referred to as an evolved Node-B or eNodeB.

As shown in FIG. 1, the example network includes a representative first eNodeB 12 and representative second eNodeBs 14 (among possibly others), with each eNodeB radiating to provide a respective coverage area defining an LTE cell. The eNodeBs are then shown by way of example having communication interfaces with a serving gateway (SGW) 16, which has a communication interface with a packet-data network gateway (PGW) 18 that provides connectivity with a packet-switched transport network 20 such as the Internet. Further, the eNodeBs are shown having communication interfaces with a mobility management entity (MME) 22, which has a communication interface with the SGW 16. And the eNodeBs are additionally shown having an interface with each other, to facilitate inter-eNodeB signaling such as handover signaling for instance. Each of these entities may sit as a node on a packet-switched network operated by a wireless service provider, and thus the illustrated interfaces between the entities may be logical connections across that network.

Under LTE, each eNodeB's cell defines an air interface on a given carrier frequency that occupies one or more frequency channels having a bandwidth such as 5 MHz, 10 MHz, 15 MHz, or 20 MHz, among other possibilities. The carrier could be frequency division duplex (FDD), with separate frequency channels for downlink and uplink communication, or time division duplex (TDD), with a single frequency channel being multiplexed over time for downlink and uplink use.

According to LTE, the air interface is divided over time into a continuum of frames each 10-milliseconds long, with each frame being divided into ten 1-millisecond subframes or transmission time intervals, and each subframe is further divided into a number of symbol time segments each being 66.7 microseconds in an example implementation. Further, in each subframe, the bandwidth of the LTE air interface is divided into 15 kHz subcarriers. Thus, the LTE air interface defines in each subframe an array of "resource elements," each occupying a 15 kHz subcarrier and spanning a 66.7-microsecond symbol time segment, which can be used to carry data according to applicable modulation and coding schemes.

On the downlink and uplink, the resource elements in each subframe are additionally divided into groups referred to as "physical resource blocks" (PRBs), which the eNodeB can allocate on an as needed basis to carry bearer data communications. Further, certain resource elements on the air interface are reserved for special use.

For instance, in each downlink subframe, the resource elements of the first one, two, or three symbol time segments are generally reserved to define a downlink control region for carrying control signaling, such as scheduling directives and acknowledgement messages, from the base station to UEs, and the resource elements in the remaining symbol time segments are generally reserved to define a downlink shared channel for carrying scheduled data in PRBs to UEs. In addition, resource elements distributed in a defined pattern throughout each downlink subframe are reserved to carry a reference signal that UEs can use to evaluate coverage. And other resource elements in particular subframes are reserved to carry synchronization signals, broadcast system messages, and the like.

Whereas, in each uplink subframe, PRBs consisting of resource elements at the low end and high end of the subframe are generally reserved to define an uplink control region for carrying control signaling, such as scheduling requests, from UEs to the eNodeB, and the remaining PRBs throughout the subframe are generally reserved to define an uplink shared channel for carrying scheduled data in the PRBs from UEs to the eNodeB. In addition, certain resource elements at defined positions on the uplink can be reserved to carry random access signaling from UEs to the eNodeB.

As noted above, when a UE enters into coverage of such a network, the UE may scan for coverage and evaluate RSRP and/or RSRQ to determine which eNodeB to connect with. The UE may then engage in random access and Radio Resource Configuration (RRC) connection signaling with the selected eNodeB to establish an RRC connection defining a radio-link connection between the eNodeB and the UE. Further, through the RRC connection, the UE may engage in attach signaling with the MME 22 to register for service with the network, and the MME may authenticate the UE and engage in signaling with the eNodeB and the SGW 16 to coordinate setup for the UE of one or more bearers for carrying data between the UE and the PGW 18 via the air interface, the eNodeB, and the SGW.

The eNodeB could then serve the UE in an RRC connected mode, in which the eNodeB can coordinate data communications over the air interface to and from the UE. For instance, when the eNodeB receives data destined to the UE, the eNodeB could allocate one or more downlink PRBs in a subframe to carry the data, and in that subframe the eNodeB could transmit to the UE a scheduling directive specifying the allocated PRB(s) and transmit the data to the UE in the allocated PRB(s). And when the UE has data to transmit, the UE could sent to the eNodeB a scheduling request, the eNodeB could allocate one or more uplink PRBs in a subframe to carry the data and could transmit to the UE in advance of that subframe a DCI message specifying the allocated PRB(s), and the UE could transmit the data to the eNodeB in the allocated PRB(s).

FIG. 1 depicts several example UEs 24, 26, 28, 30 that may be within coverage of both eNodeB 12 and eNodeBs 14 but are generally positioned relatively far away from eNodeB 12.

Some or all of these UEs may be end-user devices of the types noted above, operating autonomously or with user involvement. Each such UE may thus connect with and be served by one of the illustrated eNodeBs and may then engage in data communication served by the eNodeB.

Alternatively, some or all of the UEs may be UE-relay components of relays as discussed above, which serve to obtain wireless backhaul connectivity for relay base stations (not shown) that themselves then serve end-user UEs or other relays. When a UE-relay connects with an eNodeB, the eNodeB operates as a donor eNodeB for associated relay. Further, bearers established for the UE-relay may provide internal core-network connectivity rather than external transport network connectivity, to enable the associated eNodeB component of the relay to communicate with other entities on the core network. In practice, the network may also include an element management system (EMS) (not shown) or other server, and UE-relays may regularly report to the server operational data of various sorts for diagnostic or other purposes.

In the example arrangement shown in FIG. 1, there may be an instance where most or all of the illustrated UEs are connected with and served by eNodeB 12, even though the UEs are positioned relatively far away from eNodeB 12 and may in fact be closer to one or more of eNodeBs 14. As noted above, this could happen for various reasons. By way of example, it may be the case that the UEs detected better coverage from one or more nearby eNodeB 14 than from the distant eNodeB 12 but that the nearby eNodeB(s) 14 did not have capacity at the time to serve the UEs and therefore declined to admit them. And as another example, topology or other obstructions may have caused the UEs to have relatively low SINR from the nearby eNodeB 14 and higher SINR from the distant eNodeB(s) 14.

As explained above, having such distant UEs served by eNodeB 12 could cause issues for service by eNodeB 12. For instance, with UEs positioned so far away, it may become necessary for the UEs and the eNodeB 12 to engage in higher-power transmission. For the eNodeB 12, this could pose an issue, as this could limit the transmission power available for the eNodeB to transmit to others. Further, the higher power uplink transmissions from the distant UEs to the eNodeB 12 could contribute to the uplink noise floor at eNodeB 12, which could impact the eNodeB's receipt of communications from other UEs. Other issues may exist as well.

Per the present disclosure, as noted above, an eNodeB such as eNodeB 12 could determine that a problem situation exists by detecting that uplink noise at the eNodeB is threshold high and that at least a predefined threshold number of UEs served by the eNodeB are each located at least a predefined threshold distance away from the eNodeB. And the eNodeB could then automatically take action to help address the situation, by selecting at least one such distant UE based on it having a highest uplink transmission power (and being threshold distant) and causing the selected UE to be handed over from the base station.

In an example implementation, the eNodeB could regularly monitor the level of uplink noise on its air interface to determine when the uplink noise is threshold high. For this purpose, the uplink noise (e.g., noise floor) could be a measure of energy level on the uplink in the absence of uplink transmission scheduled by the eNodeB. For example, the eNodeB could regularly (e.g., periodically) measure the total energy level on a particular PRB on the uplink shared channel when the PRB is not allocated by the eNodeB for use by any served UE. And the eNodeB could compare the measured energy level with a threshold level deemed (e.g., by engineering design) to represent possibly-problematic high uplink noise, so as to determine when the uplink noise is threshold high. Alternatively, the eNodeB could track and evaluate uplink noise in other ways, such as based on how often uplink measures of SINR for received UE transmissions are lower than a predefined threshold.

Further, the eNodeB could also evaluate how far away various served UEs are located from the eNodeB. In practice, the eNodeB could do this regularly or could do this in response to one or more triggers, such as in response to having detected the threshold high uplink noise on the air interface. The eNodeB could determine how distant a served UE is from the eNodeB in various ways. For instance, the eNodeB could determine the UE's geographic location (e.g., reported by the UE and/or through use of network-assisted location-determination techniques) and could compare the UE's geographic location with the eNodeB's geographic location to determine the UE's distance. Alternatively or additionally, the eNodeB could estimate the UE's distance based on a measure of signal delay for transmission over the air between the eNodeB and the UE.

With this information, the eNodeB could thus identify any of its served UEs that are each located at least a predefined threshold distance from the eNodeB. Here, the threshold distance could be defined in various ways, representing relative long-distance from the eNodeB. For instance, the threshold distance could be defined as being at least a particular percentage (e.g., in the range of 75% to 100%) of the overall distance of coverage provided by the eNodeB and/or being near the eNodeB's outer cell edge. Further, the threshold distance could be defined based on how close other eNodeBs are to the eNodeB at issue, such as being near a mid-point between the eNodeBs. And the threshold distance per UE could also depend on bearing of the UE from the eNodeB, with a higher threshold being applied in certain directions versus other directions. Other examples are possible as well.

Through these or other mechanisms, during operation, the eNodeB could thus detect a situation where (i) noise on the uplink is threshold high and (ii) multiple UEs being served by the eNodeB are each located at least the predefined threshold distance from the eNodeB.

In response to detecting this situation, the eNodeB could then select at least one of the threshold distant served UEs to be handed over from the eNodeB, with the selection being based on the UE having highest uplink transmission power of the multiple UEs that the eNodeB determined are each located at least the predefined threshold distance from the eNodeB, and the eNodeB could cause the selected UE to be handed over.

In an example implementation, the eNodeB could determine the uplink transmission power of each UE that the eNodeB determined to be threshold distant, and the eNodeB could rank-order the UEs in order of their determined uplink transmission power or otherwise compare their uplink transmission power levels, so as to determine which one has the highest uplink transmission power of the threshold distant UEs.

The eNodeB could determine the uplink transmission power of each such UEs in various ways. By way of example, for a UE that is a UE-relay component of a relay, the eNodeB might query an EMS or other such entity to obtain a report of the UE's recent uplink transmission power (e.g., having been reported by the UE). Alternatively, for each of one or more such UE,s the eNodeB might have received one or more direct reports from the UE indicating the UE's uplink transmission power. For instance, in scheduling requests from the UE, the UE may have included a power-headroom report indicating the difference between the UE's maximum allowed transmission power level and the UE's current transmission power level. The eNodeB could then compare that power headroom level with the UE's maximum allowed transmission level, which might be indicated in a UE profile record stored by the eNodeB, and the eNodeB could thereby determine the UE's uplink transmission power level. These, like other determines discussed herein, could of course be estimates. Further, a UE's uplink transmission power could be a statistical measure, such as an average, of the UE's uplink transmission power over a recent sliding window or could take other forms.

Upon thereby identifying at least one threshold distant served UE that has the highest uplink transmission power when the eNodeB has threshold high uplink noise, the eNodeB could responsively take action to cause the identified UE to be handed over from the eNodeB to another eNodeB—in an effort to help address the situation.

In an example implementation, the eNodeB could transmit to the identified UE a directive for the UE to scan for target coverage for handover. For instance, the eNodeB could transmit to the UE a measurement-object that causes the UE to search for coverage of any other eNodeB whose reference signal satisfies a specified RSRP and/or RSRQ threshold. The UE could thus search for and find such target coverage, which might be provided by one of the other eNodeBs 14. And upon finding that target coverage, the UE could transmit to the serving eNodeB 12 a measurement report that specifies the detected target coverage and determined RSRP and/or RSRQ. And the eNodeB could responsively then process handover of the UE from the eNodeB's cell to the detected target cell.

To process handover of a UE, the serving eNodeB (as source eNodeB) could engage in handover signaling with the target eNodeB, directly or through MME 22. For instance, the serving eNodeB could transmit to the target eNodeB a handover request message, to prepare the target eNodeB to serve the UE. Upon receipt of a success response from the target eNodeB, the serving eNodeB could then transmit to the UE a handover direction message to which the UE responds by transitioning from being served by the serving eNodeB to being served instead by the target eNodeB.

Note that the serving eNodeB could cause handover of the UE in other ways as well. For instance, the serving eNodeB could more directly release its connection with the UE and direct the UE to search for and connect with another eNodeB, without the serving eNodeB engaging in handover signaling with the other eNodeB. Other examples are possible as well.

Figure 2:
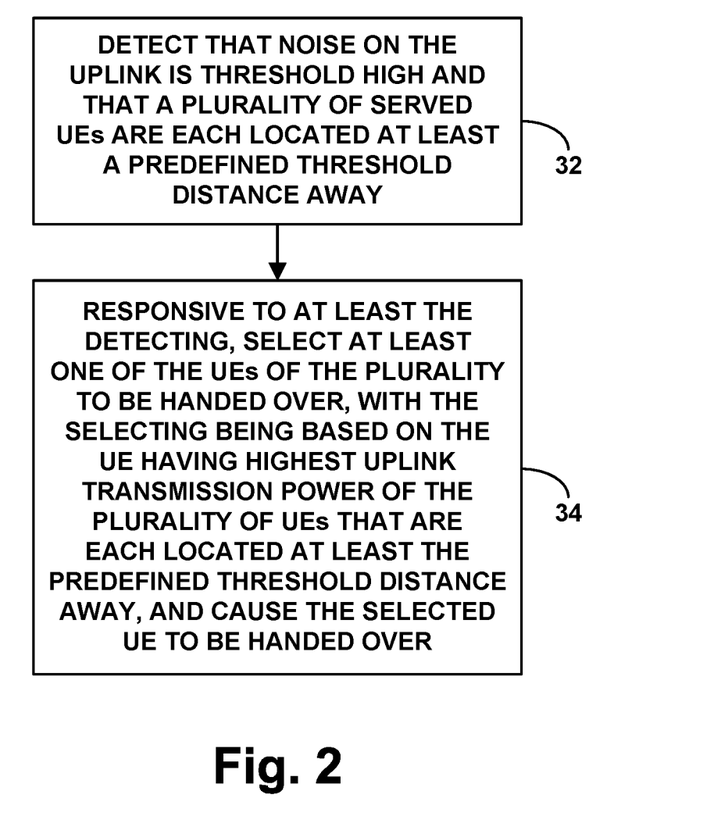
FIG. 2 is a flow chart depicting functions that can be carried out in accordance with the disclosure.

FIG. 2 is a flow chart depicting such a method for controlling service of UEs in a wireless communication system in which a base station provides a coverage area defining an air interface having a downlink and an uplink. As shown in FIG. 2, at block 32, the method includes the base station detecting that noise on the uplink is threshold high and that a plurality of UEs being served by the base station are each located at least a predefined threshold distance from the base station. And at block 34, the method includes, responsive to at least the detecting, (i) the base station selecting at least one of the UEs of the plurality to be handed over from the base station, where the selecting of the UE is based on the UE having highest uplink transmission power of the plurality of UEs that are each located at least the predefined threshold distance from the base station, and (ii) the base station causing the selected UE to be handed over from the base station.

In practice, the method could additionally include the base station determining that the plurality of UEs each located at least the predefined threshold distance from the base station is at least a predefined threshold quantity of UEs. For instance, the base station may determine that the plurality of UEs is at least three UEs, or is at least another quantity deemed to be sufficient to represent a possible issue in combination with the other factors discussed herein. And the determination that the plurality is at least the predefined quantity could be a further basis for the base station's then responsively selecting a UE to hand over and causing the UE to handover.

In line with the discussion above, the uplink may span a frequency range that defines a plurality of PRBs. And the act of the base station detecting that noise on the uplink is threshold high could involve (i) the base station monitoring, as a measure of the uplink noise, an uplink noise floor on at least one of the uplink PRBs, where the uplink noise floor represents energy level in absence of uplink transmission scheduled by the base station and (ii) the base station determining that the measure of uplink noise is at least as high as a predefined threshold level.

Further, as discussed above, the act of the base station detecting that the plurality of UEs are each at least the predefined threshold distance from the base station could involve, for at least a given one of the UEs of the plurality, (i) the base station determining a geographic location of the given UE, (ii) the base station comparing the determined geographic location of the given UE with a geographic location of the base station, and (iii) based on the comparing, the base station determining that the given UE is located at least the predefined threshold distance from the base station. Alternatively or additionally, the act of the base station detecting that the plurality of UEs are each located at least the predefined threshold distance from the base station comprises, for at least a given one of the UEs of the plurality, the base station determining a distance of the given UE from the base station based on evaluation of signal transmission delay between the UE and the base station.

In addition, as discussed above, the act of selecting the UE based on the UE having highest uplink transmission power of the plurality of UEs that are each located at least the predefined threshold distance from the base station could involve (i) the base station determining an uplink transmission power respectively of each UE of the plurality, (ii) the base station determining that the determined uplink transmission power of the UE is highest among the determined uplink transmission powers of the UEs of the plurality, and (iii) the base station selecting the UE based on the determining that the determined uplink transmission power of the UE is highest among the determined uplink transmission powers of the UEs of the plurality.

Further, as noted above, at least one of the UEs of the plurality may report its uplink transmission power to an entity within the wireless communication system (such as an EMS or the like), in which case the act of the base station determining the uplink transmission power of the at least one UE of the plurality could involve the base station querying the entity to determine the uplink transmission power respectively of each such UE.

And as additionally discussed above, the act of causing the selected UE to be handed over from the base station could involve directing the selected UE to scan for handover coverage, receiving from the selected UE, in response to the directing, a report of detected coverage of a handover target, and handing over the UE to the handover target.

Figure 3:
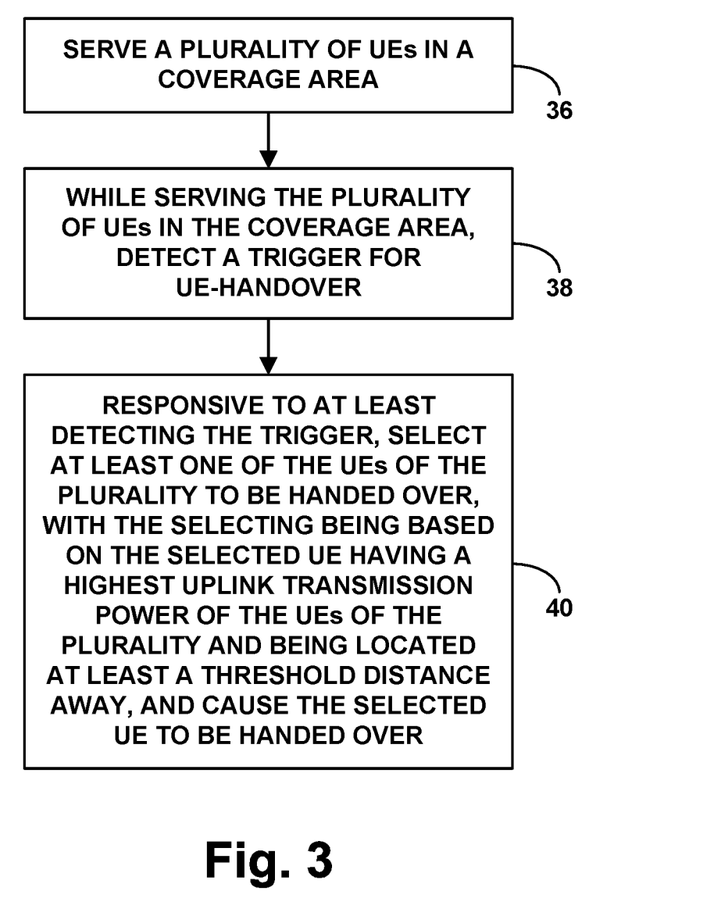
FIG. 3 is another flow chart depicting functions that can be carried out in accordance with the disclosure.

FIG. 3 is next another flow chart depicting a method for controlling service in a wireless communication system in which a base station provides a coverage area defining an air interface having a downlink and an uplink. As shown in FIG. 3, at block 36, the base station serves a plurality of UEs in the coverage area. At block 38, while serving the plurality of UEs in the coverage area, the base station detects a trigger for UE-handover, which might comprise detecting that a noise floor on the uplink is threshold high and/or might take other forms. In turn, at block 40, responsive to at least detecting the trigger, (i) the base station selects at least one of the UEs of the plurality to be handed over from the base station, where the selecting is based on the selected UE having a highest uplink transmission power of the UEs of the plurality and being located at least a threshold distance from the base station, and (ii) the base station causes the selected UE to be handed over from the base station.

Figure 4:
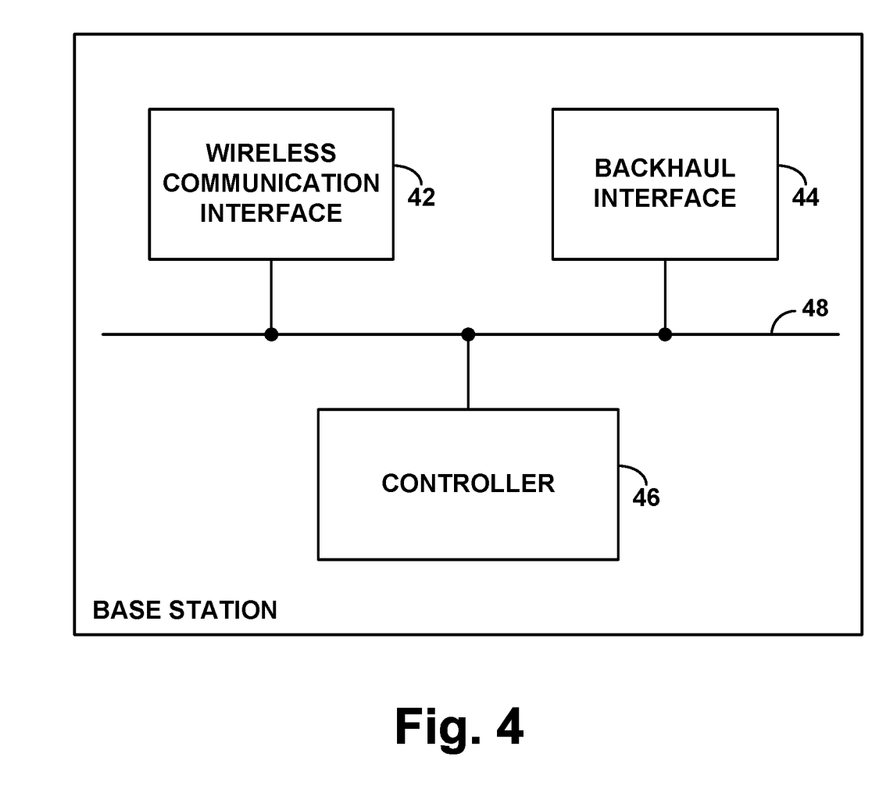
FIG. 4 is a simplified block diagram of an example base station in accordance with the disclosure.

Finally, FIG. 4 is a simplified block diagram of an example base station operable in accordance with the discussion above. As shown in FIG. 4, the example base station includes a wireless communication interface 42, a backhaul interface 44, and a controller 46, all of which may be communicatively linked together by a system bus, network, or other connection mechanism 48.

In this arrangement, the wireless communication interface 42 may be configured to provide cellular coverage and to engage in air interface communication with served UEs. As such, wireless communication interface 42 may comprise an antenna structure, which may be tower mounted or may take other forms, and associated components such as a power amplifier and a wireless transceiver, so as to facilitate providing a coverage area defining an air interface having a downlink and an uplink, and engaging in transmission and reception of bearer and control data over the air interface in accordance with an air interface protocol such as LTE or others as noted above. Further, backhaul interface 44 may comprise a wired or wireless interface, such as an Ethernet network communication interface, configured to support communication with other entities, such as with other base stations for instance.

Controller 46 may then comprise control logic to cause the base station to carry out particular functions including those discussed above. As such, the controller 46 may take various forms, including but not limited to a processing unit including one or more processors (e.g., general purpose microprocessors and/or dedicated processing units) and data storage (e.g., one or more volatile and/or non-volatile storage components, such as magnetic, optical, or flash storage) holding program instructions executable by the processing unit to cause the base station to carry out various operations described herein.

In practice, for instance, the base station operations could include detecting that noise on the uplink is threshold high and that a plurality of UEs being served by the base station are each located at least a predefined threshold distance from the base station. And the operations could further include, responsive to at least the detecting, (i) selecting at least one of the UEs of the plurality to be handed over from the base station, where the selecting of the UE is based on the UE having highest uplink transmission power of the plurality of UEs that are each located at least the predefined threshold distance from the base station, and (ii) causing the selected UE to be handed over from the base station. Further, Various features discussed above can be carried out in this context, and vice versa.

Exemplary embodiments have been described above. It should be understood, however, that variations from these embodiments are possible, while remaining within the scope of the invention.

We claim:

1. A method for controlling service of user equipment devices (UEs) in a wireless communication system in which a base station provides a coverage area defining an air interface having a downlink and an uplink, the method comprising:
  detecting by the base station that noise on the uplink is threshold high and that a plurality of UEs being served by the base station are each located at least a predefined threshold distance from the base station; and
  responsive to at least the detecting, (i) selecting by the base station at least one of the UEs of the plurality to be handed over from the base station, wherein the selecting of the UE is based on the UE having highest uplink transmission power of the plurality of UEs that are each located at least the predefined threshold distance from the base station, and (ii) causing by the base station the selected UE to be handed over from the base station.

2. The method of claim 1, wherein each of the UEs of the plurality is a UE-relay.

3. The method of claim 1, further comprising determining by the base station that the plurality of UEs each located at least the predefined threshold distance from the base station is at least a predefined threshold quantity of UEs, wherein the selecting and causing is further responsive to the determining.

4. The method of claim 1, wherein the uplink spans a frequency range defining a plurality of physical resource blocks (PRBs), and wherein detecting by the base station that noise on the uplink is threshold high comprises:
  monitoring by the base station, as a measure of the uplink noise, an uplink noise floor on at least one of the uplink PRBs, wherein the uplink noise floor represents energy level in absence of uplink transmission scheduled by the base station; and
  determining by the base station that the measure of uplink noise is at least as high as a predefined threshold level.

5. The method of claim 1, wherein detecting by the base station that the plurality of UEs are each at least the predefined threshold distance from the base station comprises, for at least a given one of the UEs of the plurality:
  determining by the base station a geographic location of the given UE;
  comparing the determined geographic location of the given UE with a geographic location of the base station; and
  based on the comparing, determining by the base station that the given UE is located at least the predefined threshold distance from the base station.

6. The method of claim 1, wherein detecting by the base station that the plurality of UEs are each located at least the predefined threshold distance from the base station comprises, for at least a given one of the UEs of the plurality:
  determining by the base station a distance of the given UE from the base station, based on evaluation of signal transmission delay between the UE and the base station.

7. The method of claim 1, wherein selecting the UE based on the UE having highest uplink transmission power of the plurality of UEs that are each located at least the predefined threshold distance from the base station comprises:
  determining by the base station an uplink transmission power respectively of each UE of the plurality;
  determining by the base station that the determined uplink transmission power of the UE is highest among the determined uplink transmission powers of the UEs of the plurality; and
  selecting the UE based on the determining that the determined uplink transmission power of the UE is highest among the determined uplink transmission powers of the UEs of the plurality.

8. The method of claim 7,
  wherein at least one UE of the plurality reports its uplink transmission power to an entity within the wireless communication system, and
  wherein determining by the base station the uplink transmission power of the at least one UE of the plurality comprises querying by the base station the entity to determine the uplink transmission power respectively of each such UE.

9. The method of claim 1, wherein causing the selected UE to be handed over from the base station comprises directing the selected UE to scan for handover coverage, receiving from the selected UE, in response to the directing, a report of detected coverage of a handover target, and handing over the UE to the handover target.

10. A base station configured to control service of user equipment devices (UEs), the base station comprising:
  a wireless communication interface, including an antenna structure and transceiver, configured to provide a coverage area defining an air interface having a downlink and an uplink;
  a processing unit;
  data storage; and
  program instructions stored in the data storage and executable by the processing unit to cause the base station to carry out operations comprising:
    detecting that noise on the uplink is threshold high and that a plurality of UEs being served by the base station are each located at least a predefined threshold distance from the base station, and
    responsive to at least the detecting, (i) selecting at least one of the UEs of the plurality to be handed over from the base station, wherein the selecting of the UE is based on the UE having highest uplink transmission power of the plurality of UEs that are each located at least the predefined threshold distance from the base station, and (ii) causing the selected UE to be handed over from the base station.

11. The base station of claim 10, wherein each of the UEs of the plurality is a UE-relay.

12. The base station of claim 11, wherein causing the selected UE to be handed over from the base station comprises directing the selected UE to scan for handover coverage, receiving from the selected UE, in response to the directing, a report of detected coverage of a handover target, and handing over the UE to the handover target.

13. The base station of claim 10, wherein the uplink spans a frequency range defining a plurality of physical resource blocks (PRBs), and wherein detecting that noise on the uplink is threshold high comprises:

monitoring, as a measure of the uplink noise, an uplink noise floor on at least one of the uplink PRBs, wherein the uplink noise floor represents energy level in absence of uplink transmission scheduled by the base station; and     determining that the measure of uplink noise is at least as high as a predefined threshold level.

14. The base station of claim 10, wherein detecting that the plurality of UEs are each at least the predefined threshold distance from the base station comprises, for at least a given one of the UEs of the plurality:

determining a geographic location of the given UE;

comparing the determined geographic location of the given UE with a geographic location of the base station; and     based on the comparing, determining that the given UE is located at least the predefined threshold distance from the base station.

15. The base station of claim 10, wherein detecting that the plurality of UEs are each located at least the predefined threshold distance from the base station comprises, for at least a given one of the UEs of the plurality:

determining a distance of the given UE from the base station, based on evaluation of signal transmission delay between the UE and the base station.

16. The base station of claim 10, wherein selecting the UE based on the UE having highest uplink transmission power of the plurality of UEs that are each located at least the predefined threshold distance from the base station comprises:

determining an uplink transmission power respectively of each UE of the plurality; and     determining that the determined uplink transmission power of the UE is highest among the determined uplink transmission powers of the UEs of the plurality; and     selecting the UE based on the determining that the determined uplink transmission power of the UE is highest among the determined uplink transmission powers of the UEs of the plurality.

17. The base station of claim 16, wherein at least one UE of the plurality reports its uplink transmission power to an entity, and wherein determining the uplink transmission power respectively of each of UE of the plurality comprises querying the entity to determine the uplink transmission power respectively of each such UE.

18. A method of controlling service in a wireless communication system in which a base station provides a coverage area defining an air interface having a downlink and an uplink, the method comprising:

serving by the base station a plurality of user equipment devices (UEs) in the coverage area;

while serving the plurality of UEs in the coverage area, detecting by the base station a trigger for UE-handover; and     responsive to at least detecting the trigger, (i) selecting by the base station at least one of the UEs of the plurality to be handed over from the base station, wherein the selecting is based on the selected UE having a highest uplink transmission power of the UEs of the plurality and being located at least a threshold distance from the base station, and (ii) causing by the base station the selected UE to be handed over from the base station.

19. The method of claim 18, wherein the UEs of the plurality are UE-relays.

20. The method of claim 18, wherein detecting the trigger for UE-handover comprises detecting that a noise floor on the uplink is threshold high.

* * * * *